May 22, 1951  H. NORBERG ET AL  2,553,669
PLANETARY MILLING MACHINE
Filed Nov. 13, 1947  7 Sheets-Sheet 1

INVENTOR.
Harold Norberg
BY Lloyd L. Lee
Barnes, Kisselle, Laughlin + Raisch
ATTORNEYS May 22, 1951 H. NORBERG ET AL 2,553,669
PLANETARY MILLING MACHINE
Filed Nov. 13, 1947 7 Sheets-Sheet 2
FIG. 5. FIG. 6.
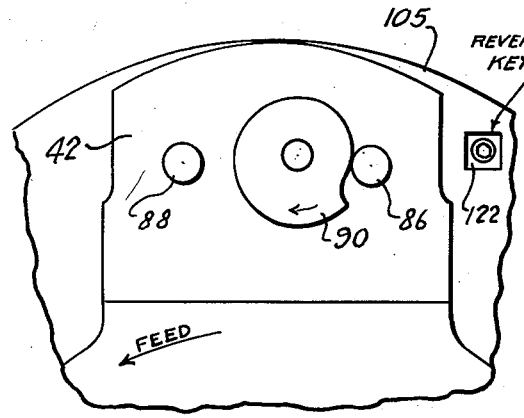
R.H. External
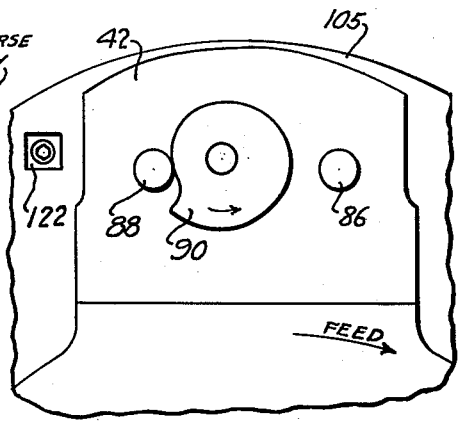
L.H. External
FIG. 7. FIG. 8.
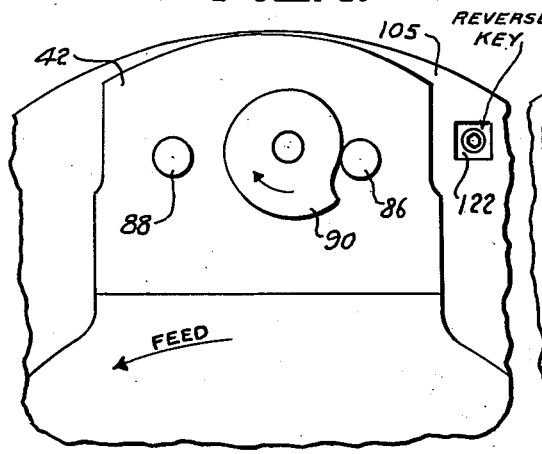
L.H. Internal
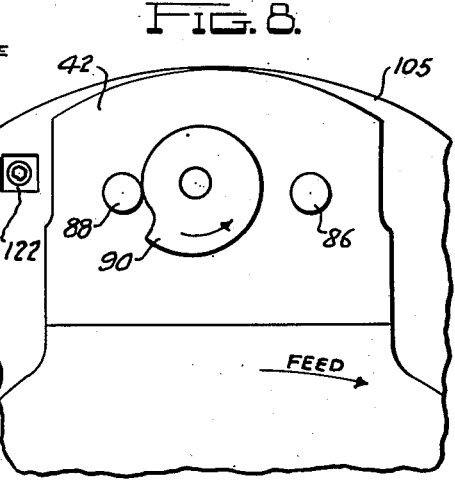
L.H. Internal
INVENTOR.
Harold Norberg
BY Lloyd L. Lee
Barnes, Kisselle, Laughlin & Raisch
ATTORNEYS

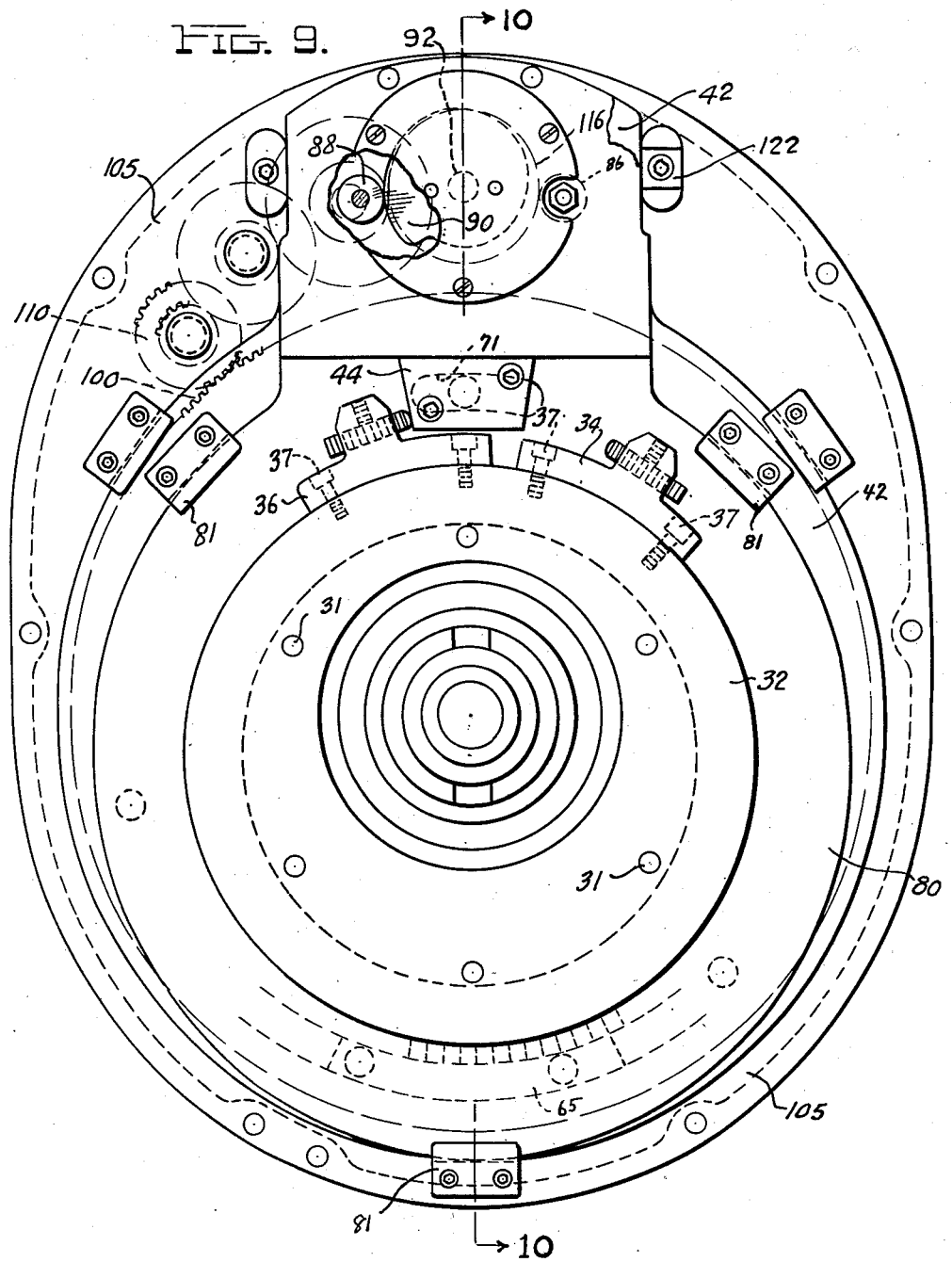

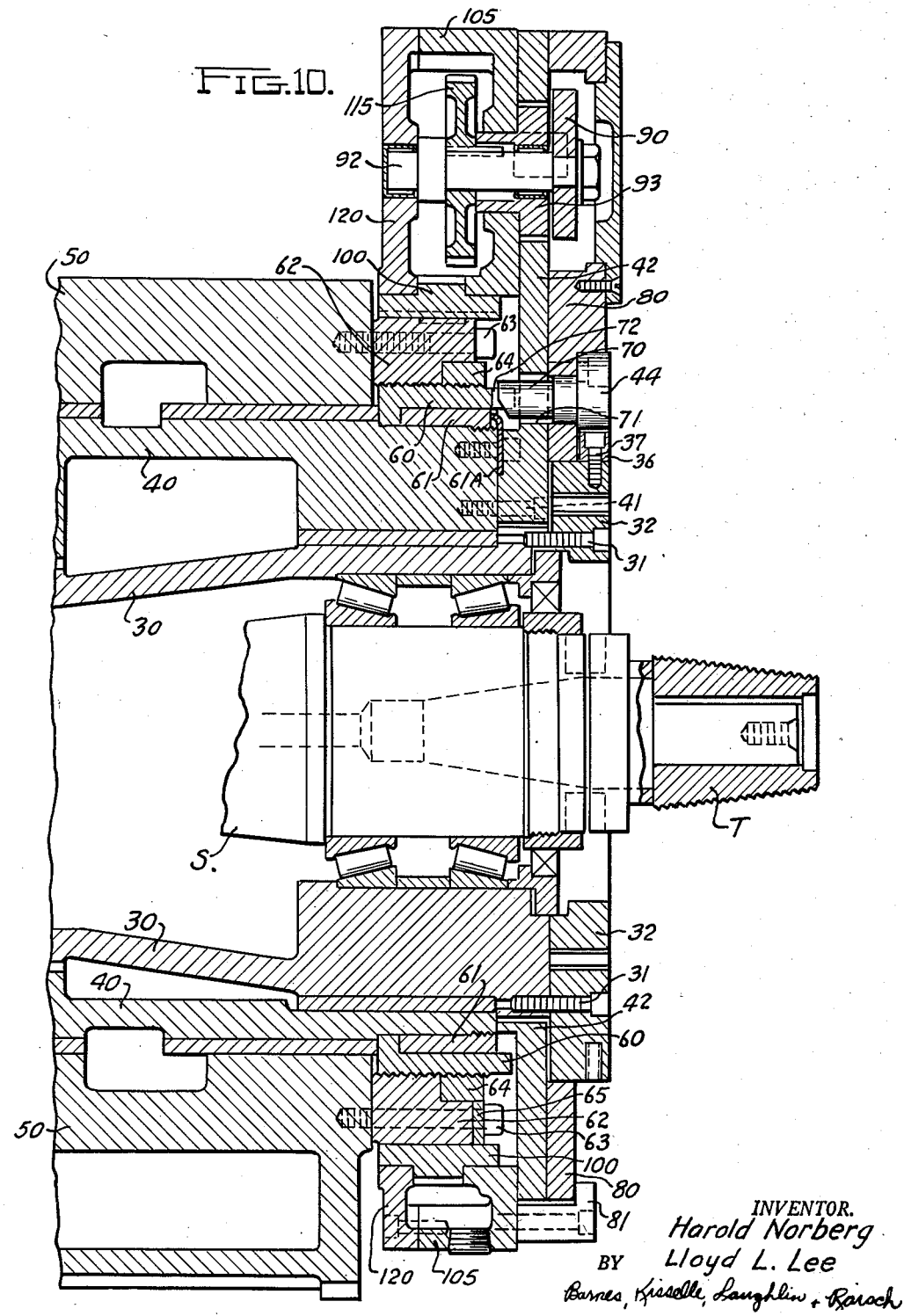

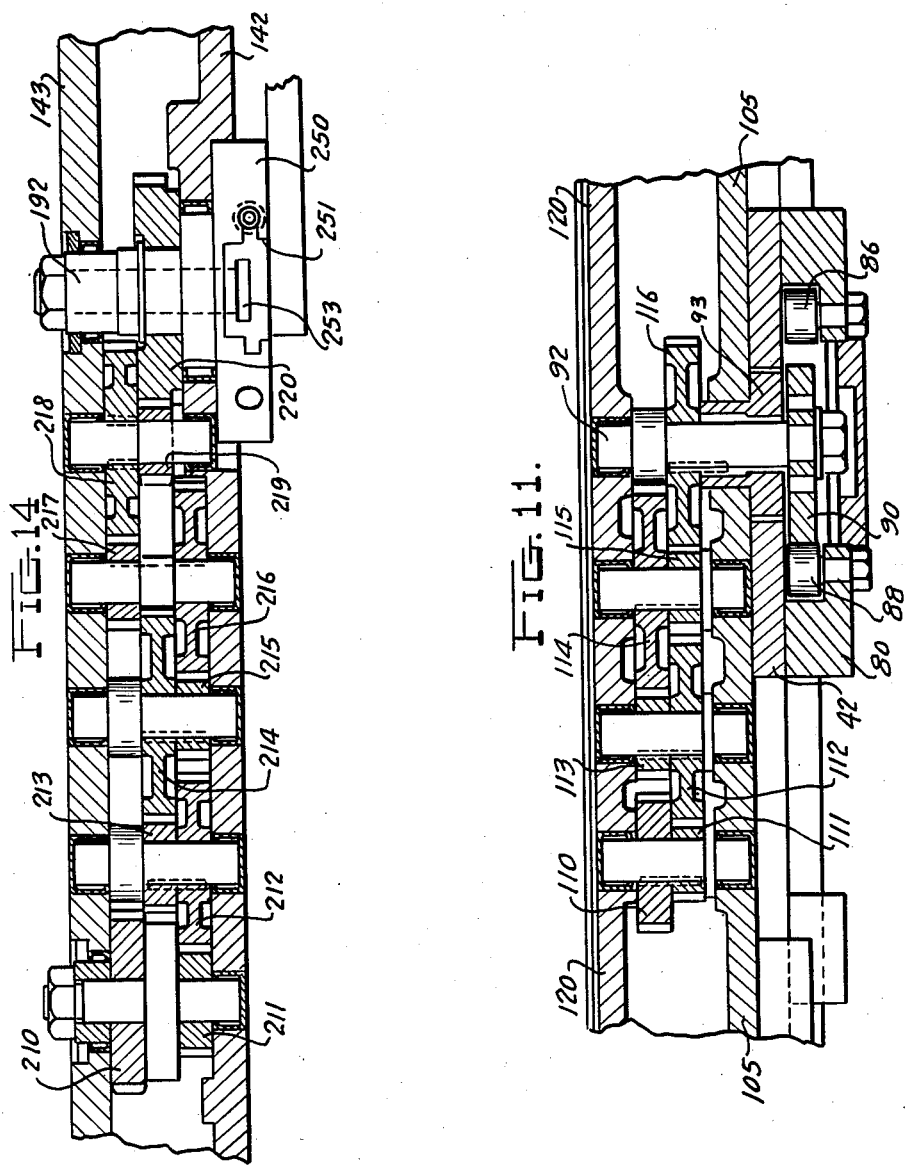

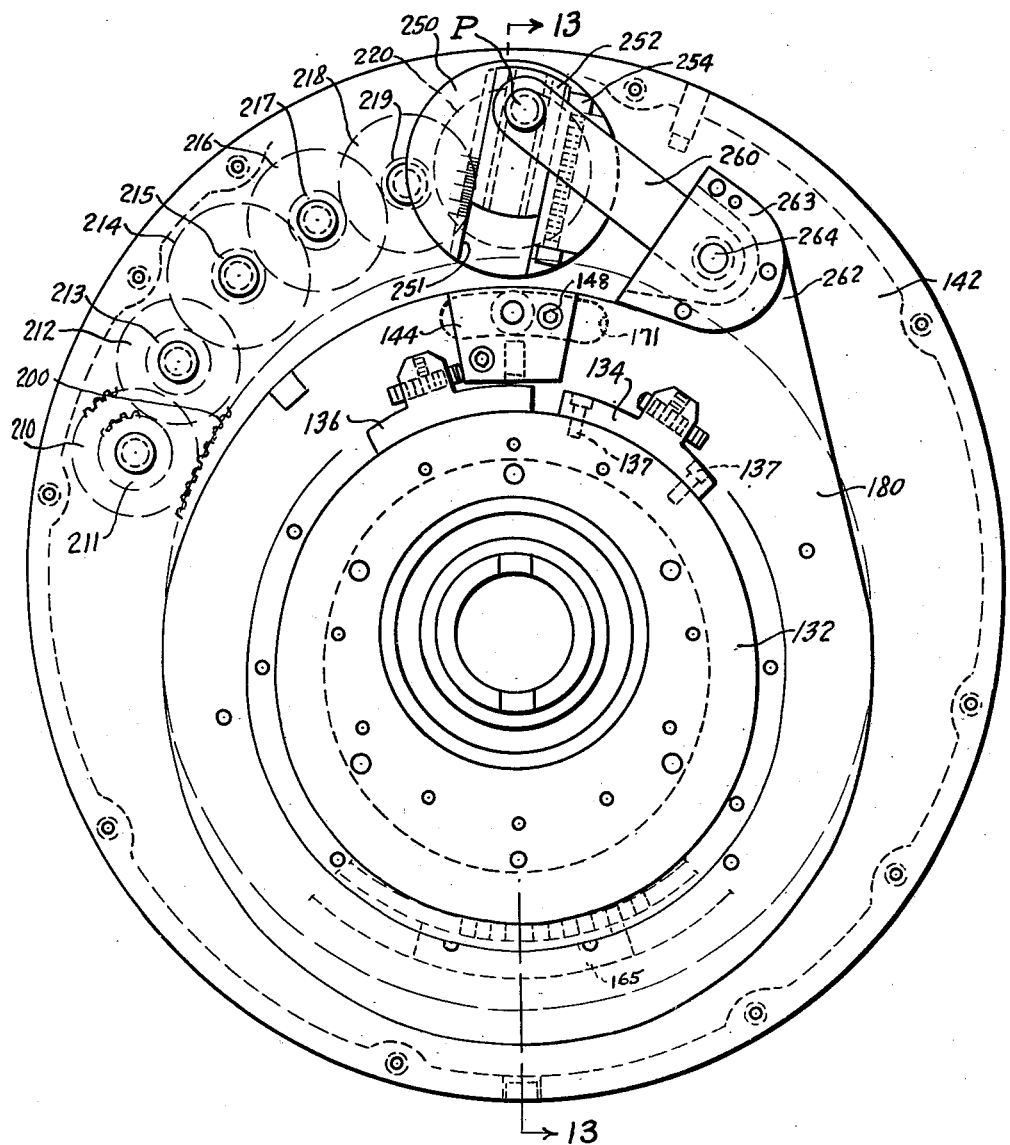

May 22, 1951   H. NORBERG ET AL   2,553,669
PLANETARY MILLING MACHINE
Filed Nov. 13, 1947   7 Sheets-Sheet 7
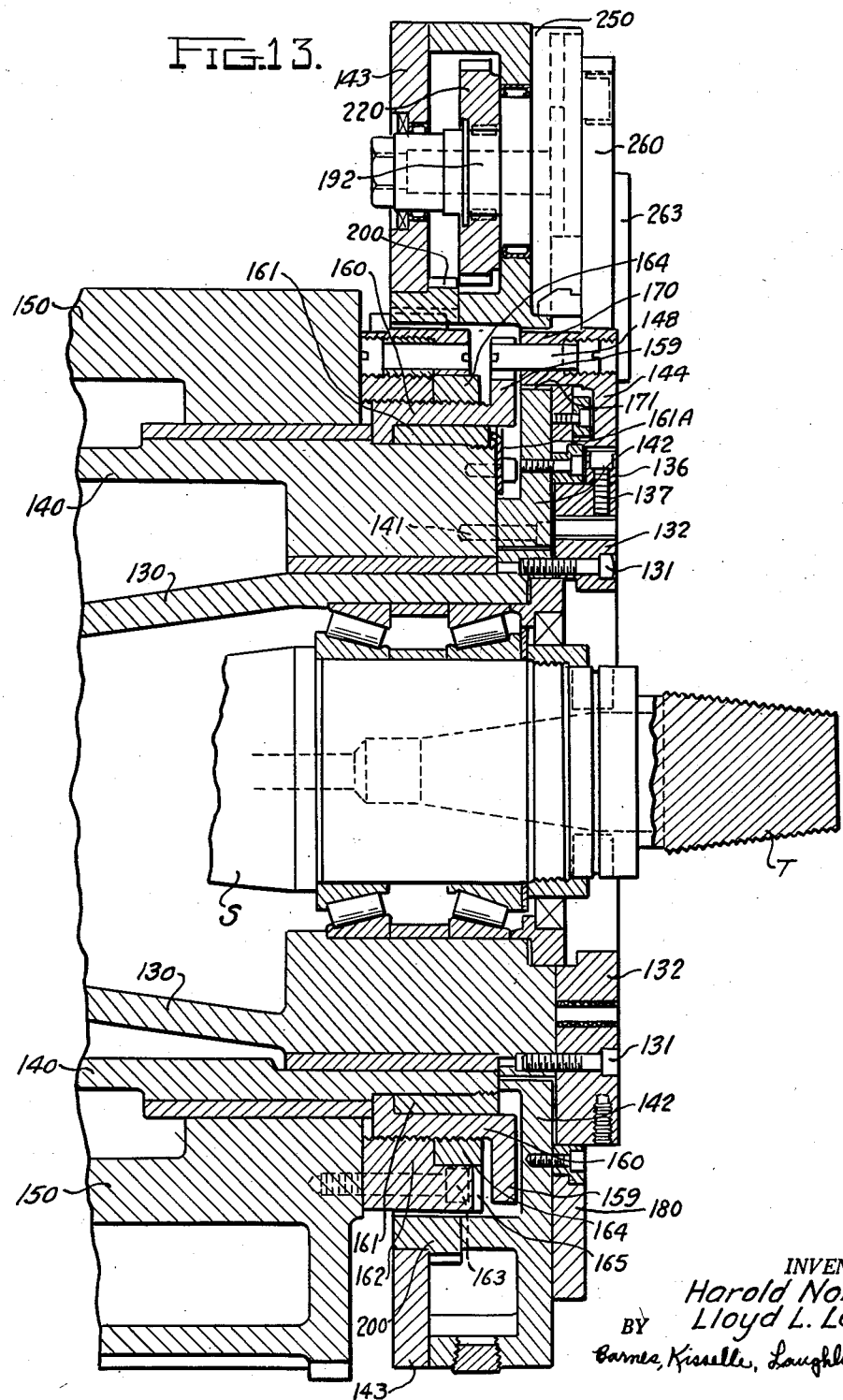
INVENTOR.
Harold Norberg
Lloyd L. Lee
BY
Barnes, Kisselle, Laughlin + Raisch
ATTORNEYS Patented May 22, 1951

2,553,669

UNITED STATES PATENT OFFICE 2,553,669

PLANETARY MILLING MACHINE

Harold Norberg and Lloyd L. Lee, Hazel Park, Mich., assignors to Plan-O-Mill Corporation, Hazel Park, Mich., a corporation of Michigan Application November 13, 1947, Serial No. 785,762

8 Claims. (Cl. 90—11.58)

This invention relates to a taper attachment for a planetary milling machine.

Planetary milling machines are in use and well known. These milling machines have been used for cutting threads both external and internal.

It is an object of the present invention to provide an attachment for a planetary milling machine which will enable the machine to cut an accurate tapered thread either external or internal.

In cutting straight threads with a planetary milling machine, a thread cutting tool is aligned radially with the surface to be cut and moved radially into the work the depth of the thread, after which a lead screw feeds the cutter through a distance of one thread as it moves in cutting relation around the surface to be threaded. For a straight thread this lead or forward movement results in an accurate reproduction of the lead screw pitch. For a tapered thread, the lead or feed movement will result in an inaccurate thread unless the cutter is given an additional movement in the direction of the taper.

It is an object of the present invention to disclose a machine for giving this additional compensating movement in an accurate manner and in a manner which can be carefully controlled.

Brief description of the several views of the drawings:

Figures 5, 6, 7 and 8 are diagrammatic views showing a cam compensator in various positions as used in the taper attachment.

Figure 9 is an elevation of the planetary milling head showing the parts in greater detail.

Figure 10 is a sectional view on line 10—10 of Figure 9.

Figure 11 is an expanded view of a gear chain, portions of which are found in Figures 9 and 10.

Figure 12 is an enlarged view of a milling head showing a modified construction for obtaining compensatory movement for taper threading.

Figure 13 is a sectional view of Figure 12 on line 13—13.

Figure 14 is an expanded view of a gear chain found in Figures 12 and 13.

In Figure 1 a planetary milling machine M has a milling head H and a workholder W. A taper cutter tool is shown at T and a piece of work P is mounted in the machine.

Figure 1:
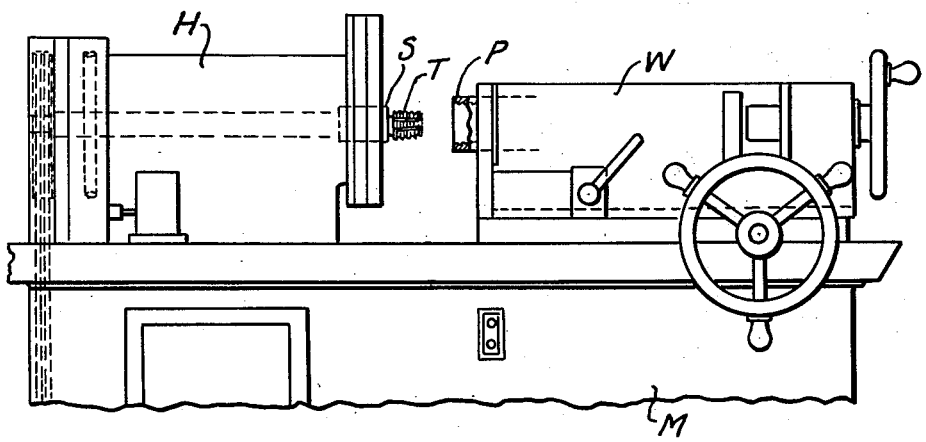
Figure 1 is an outline view of a planetary milling machine with a taper attachment thereon.
Figure 2:
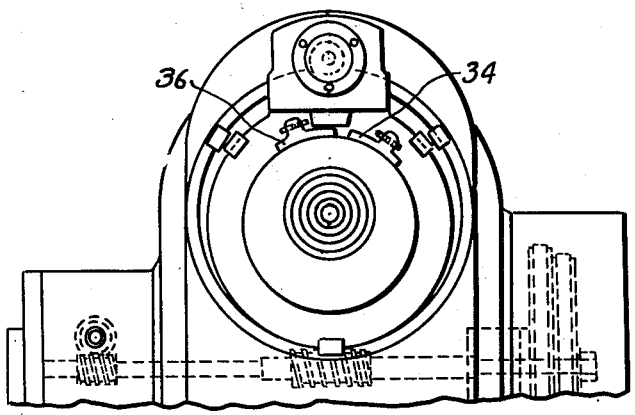
Figure 2 is an outline view of the milling head of the machine.

In a planetary milling machine, a tool spindle S is mounted on suitable bearings for cutting rotation in an inner drive cylinder 30 (Figure 10). This spindle is eccentrically mounted in the inner drive cylinder. The inner drive cylinder is mounted eccentrically in suitable bushings in an outer drive cylinder 40. The outer drive cylinder is mounted for rotation in sleeve bushings in a frame structure 50.

For the purposes of clarity, the parts in sectional figures, such as Figure 10, which due to their circular cross section appear at the top and bottom of the drawings will be marked with reference characters at the top and bottom.

On the face end of the inner drive cylinder 30, secured by screws 31 is an adjustable dog plate 32 which rotates with the inner drive cylinder. Adjustable dogs 34 and 36, shown best in Figure 9, are fixed by screws 37 on the adjustable dog plate at predetermined locations as will be later explained. The dog plate has holes tapped at a plurality of points around its periphery to receive screws 37. On the face end of the outer drive cylinder 40 held on by a plurality of screws 41 is an outer drive plate 42 which rotates with the outer drive cylinder. When one of the dogs 34 or 36, depending on the direction of rotation, on the adjustable dog plate 32 contacts a fixed dog 44, (Fig. 9) both the inner drive cylinder and the outer drive cylinder will rotate together.

This is standard operation in planetary milling machines. The inner drive cylinder starts rotating and due to the eccentric mounting of the spindle S, the tool travels in a helical path. This continues up to the time that one of the dogs of the inner drive cylinder contacts the outer drive cylinder and the entire assembly revolve together. The tool then starts moving in a circular path while still rotating at a predetermined distance from the center of the assembly, and by this time it has reached its cutting position and is traveling around the work.

As the assembly rotates in the frame 50, a lead screw 60 comes into action to feed the tool T in the proper forward movement for the thread being cut. The lead screw is rotatably positioned around the outer drive cylinder 40 and bears on a ring 61 threaded on the end of member 40 and locked by a clip 61A. A lead screw nut 62 is fastened to the frame 50 by bolts 63. An adjusting nut 64 is interposed between the parts to take up play resulting from wear and an adjusting nut lockplate 65 establishes the relation between the parts. The fixed dog 44 has a rearward extension 70 which passes through a slot 71 in outer drive plate 42 to engage a notch 72 in lead screw 60 so that the fixed dog 44 and the lead screw rotate together at all times. The lead screw will always have the same pitch as the threading tool.

In a straight thread planetary milling machine there can be a direct contact between the dogs 34—36 which rotate with the inner drive member 30, and the fixed dog 44 which is usually mounted on the plate 42 fastened to the outer drive member or quill 40.

In the present disclosure it will be noted that the plate 42 is slotted at 71 so that the rearward extension 70 of dog 44 passes through the plate 42 to the lead screw.

Revolving force is transmitted from member 30 to member 40 through a mechanism which compensates for the taper of the thread being cut. The so-called fixed dog 44, which is moved by dogs 34 or 36 on member 32, is mounted on a carrier plate 80 which in turn is rotatably mounted around the adjustable dog plate 32. Gibs 81 hold carrier plate 80 against the outer drive plate 42. On the carrier plate are cam rollers 86 and 88 (Fig. 11). On the outer drive or quill plate 42 is mounted a cam 90 on a cam shaft 92 in a bearing holder 93. Thus force by dog 36 on fixed cam 44 is exerted by roller 88 on cam 90 and thence to the outer quill plate 42 and to quill 40. Once the dog 44 is picked up by inner quill 30 the lead screw will rotate with the dog to give a straight advance to the outer quill.

But the relationship between the lead screw moving with the drive member 30 with respect to the drive or quill 40 may be altered by changing the position of cam 90. A ring gear 100 is keyed to the outside of lead screw nut 62 and surrounded by a gear housing 105 secured by quill plate 42. A chain of gears is mounted in the housing, the first of the chain 110 contacting the ring gear and the last of the chain 116 being mounted on cam shaft 92. All of the gears 110, 111, 112, 113, 114, 115, and 116 are mounted between the walls of gear housing 105 and gear housing cover plate 120 (Fig. 11). The gear housing rotates about the ring gear and in so doing causes rotation of the gear chain and a rotation of cam 90.

Figure 3:
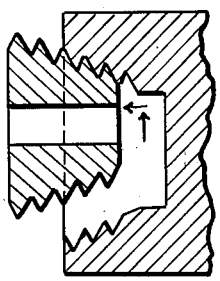
Figures 3 and 4 illustrate the manner in which a cutter contacts the work for tapered threading.
Figure 4:
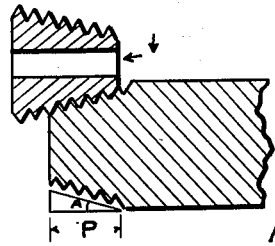

The cam 90 is formed to shift the cutter in the direction of the taper. Whether the cutter is shifted toward or away from the work depends on whether the cutter is making a conventional cut or a climb cut. For each pitch width the taper progresses a specified distance radially. The cutter actually travels a true spiral into a pitch cone. The cam is shaped to change the relationship between the drive member 30 and the outer drive member 40 a specified distance such that as the cutter moves axially the distance of one pitch, it has actually shifted radially also. For each thread pitch and each taper the relationship will be different and the cam will necessarily be different. In Figs. 3 and 4 the small arrows indicate the direction of movement for conventional cutting. In Fig. 4, the small triangle is illustrative of the movement. If the side marked P represents pitch and the angle A is the taper, the tangent of the angle represents the proper radial movement for each pitch.

In the operation when the inner drive quill 30 starts to move carrying the rotating cutter to its work position, the cam 34 or the cam 36 depending on the direction of rotation will contact fixed dog 44. The outer drive quill 40 then starts to move. At this time the cutter has reached its cutting position as shown, for example, in Fig. 3. As quill 40 rotates, the lead screw acts to shift the combined quills in pitch relation to the work. But as soon as quill 40 starts to rotate the gear train 110—116 starts to rotate cam 90 moving with quill 40, which cam bears against roller 86 or 88, depending on the direction of rotation, the rollers being mounted on the inner quill 30. And the cam 90 shifts the quill plate 42 to the extent that the cutter moves the radial amount of the taper in one pitch distance. This movement, in effect, prevents the cutter from overcutting the threads as it progresses on the taper cut. Figs. 3 and 4 illustrate by the arrows the compound movement that must take place.

For reversal movement a reverse key 122 is provided to start reversal of all parts when dog 34 or 36 come into action. This reverse key may be moved to one side or the other depending on the direction of the thread being cut and is provided to prevent roller-cam contact in the reverse movement. In Figs. 5 to 8, various combinations are shown for internal and external and right or left-hand threads.

The embodiment of Fig. 13 is much like that in Fig. 10 as far as the driving parts are concerned. The tool spindle S is eccentrically mounted on suitable bearings in an inner drive cylinder 130 which in turn is mounted eccentrically in suitable bushings in an outer drive cylinder 140. Frame structure 150 supports the parts for rotation.

On the face end of the inner drive cylinder 130 secured by screws 131 is an adjustable dog plate 132 which rotates with the inner drive cylinder. Adjustable dogs 134 and 136, shown best in Fig. 12, are fixed by screws 137 on the adjustable dog plate at predetermined locations. On the face end of the outer drive cylinder 140, held in place by a plurality of screws 141 is an outer drive plate 142 which rotates with the outer drive cylinder. Dog 144 is mounted on a carrier plate 180 in the path of dogs 134 and 136. A bolt 148 supported in dog 144 passes through the dog to engage a notch in the extending flange 159 of a lead screw 160. A rearward extension 170 of dog 144 moves in an arcuate slot 171 in plate 142 (Figs. 12, 13).

The lead screw 160 is positioned around the outer drive cylinder 140 and bears on a ring 161 threaded on the end of member 140 and locked by clip 161A. A lead screw nut 162 is fastened to the frame 150 by bolts 163. An adjusting nut 164 is interposed between the parts and an adjusting nut lockplate 165 establishes the relation between the parts.

The relationship between drive member 130 and the outer drive or quill 140 is governed by a crank arrangement in the embodiment of Fig. 12. A ring gear 200 is keyed to the outside of lead screw nut 162 and the outer quill plate 142 cooperates with a cover plate 143 to form a gear housing around the ring gear in which are mounted a chain of gears 210, 211, 212, 213, 214, 215, 216, 217, 218, 219, and 220. Gear 210 engages and is turned by ring gear 200. The last gear 220 of the chain is mounted on shaft 192 on which is mounted a crank wheel 250 (Fig. 14). Crank wheel 250 is slotted at 251 to receive a slide 252 locked in position by a headed pin 253 within shaft 192. One side of slide 252 is racked to cooperate with an adjusting screw 254 mounted along the slide in wheel 250.

A crank bar 260 is pinned to the slide 252 at one end and at the other end to a radial extension 262 of the carrier plate 180 on which dog 144 is mounted. Plate 263 serves as a bearing for a cross pin 264 together with the extension 262.

Operation of this construction is much the same as the previous construction of Fig. 9. When inner quill 130 moves dog 136 on plate 132 to contact dog 144, the motion of dog 144 is transmitted to crank bar 260 which will drag the outer quill plate 142 and gear housing formed therewith.

Movement of the gear housing will start the gear chain in revolution since the lead screw 160 and the ring gear fastened thereto are stationary with the frame 150. The gear chain will rotate crank wheel 250. If the point P represents the center of the pin connecting crank bar 260 to slide 252, when P is at the center of wheel 250 there would be not change in the relation between the inner quill 130 and the outer quill 140. But when the slide is moved so that the point P is off center, then crank 260 will change the relation of the outer quill radially with respect to the work.

The embodiment of Figs. 12, 13 has an advantage over the device shown in Figs. 9, 10, in that it may be adjusted over a wide range of pitches and diameters. With the cam arrangement of Fig. 9, a different cam must be used for each thread cut.

What we claim is:

1. In a planetary milling machine of the type having an inner quill, an outer quill and a cutter spindle, a frame supporting the quills, a means for providing compensating movement in a taper thread cut which comprises plates on the forward ends of each quill, a cam on the outer quill plate, a ring gear fastened to said frame, a gear chain connecting said cam and ring gear whereby said cam rotates upon movement of said outer quill, an intermediate member between said plates and mounted on said outer quill plate adapted to be contacted by the inner quill plate and means on said intermediate member to be actuated by said cam to cause motion of said inner quill relative to said outer quill during the rotation of the parts to effect a spiral movement of the cutter spindle in a taper thread cut.

2. In a planetary milling machine of the type having an inner quill, an outer quill and a tool spindle within the inner quill, and a frame supporting said quills such that the tool spindle approaches a cutting orbit upon movement of the inner quill and rotates in said orbit when the inner quill picks up the outer quill, means for compensating for taper thread cuts which comprises a plate on the face end of each quill, a ring gear mounted on the frame, a crank wheel mounted on the outer quill plate, a gear chain mounted on said plate arranged in operative relation between the crank wheel and the ring gear to be actuated by relative movement between the outer quill plate and the frame, an intermediate member mounted between the inner quill plate and the outer quill plate adapted to be contacted by the inner quill plate as the tool spindle reaches its cutting orbit, and a crank bar connecting the crank wheel on the outer quill plate and the intermediate member whereby rotation of said outer quill plate will effect relative movement of said inner quill plate with respect to said outer quill plate to move the cutting spindle from the cutting orbit in a radial direction equal to the taper cut.

3. A device as described in claim 2 in which the crank bar is connected to the crank wheel by a member adjustably slidable in the crank wheel diametrically thereof and means for controlling the position of said sliding member relative to the center of the crank wheel.

4. In a planetary milling machine of the type having an inner quill, an outer quill, a tool spindle within the inner quill, a frame supporting said quills and a lead nut on said frame, a lead screw around said outer quill rotatably associated therewith and means for effecting movement of said tool spindle in a conical spiral cutting movement comprising an intermediate member positioned to be contacted by said inner spindle at a point in rotation, a member connecting said intermediate member and said lead screw for simultaneous rotation with said inner spindle, and means connecting said intermediate member and said outer quill responsive to movement of said outer quill to change the angular relation between said intermediate member and said outer quill and thus between said outer and inner quills, said change thereby shifting said tool spindle radially while moving with the lead screw, said connecting means comprising a cam on said outer quill, a ring gear on said frame, a gear chain connecting said ring gear and quill, and a cam roller on said intermediate member transferring rotative force from said inner quill to said outer quill through said cam.

5. In a planetary milling machine of the type having an inner quill, an outer quill, a tool spindle within the inner quill, a frame supporting said quills and a lead nut on said frame, a lead screw around said outer quill rotatably associated therewith and means for effecting movement of said tool spindle in a conical spiral cutting movement comprising an intermediate member positioned to be contacted by said inner spindle at a point in rotation, a member connecting said intermediate member and said lead screw for simultaneous rotation with said inner spindle, and means connecting said intermediate member and said outer quill responsive to movement of said outer quill to change the angular relation between said intermediate member and said outer quill and thus between said outer and inner quills, said change thereby shifting said tool spindle radially while moving with the lead screw, said connecting means comprising a crank wheel on said outer quill, a ring gear on said frame, a gear chain connecting said ring gear and said wheel, and a crank bar connecting said wheel and said intermediate member to transfer rotative force from said inner quill to said outer quill.

6. A machine as described in claim 5 in which the crank bar is connected to the crank wheel by a member adjustably slidable in the crank wheel diametrically thereof, and means for controlling the position of said sliding member relative to the center of the crank wheel.

7. In a planetary milling machine of the type having an inner quill, an outer quill, a cutter spindle, and a frame supporting the quills, a means for providing compensating movement in a taper thread cut which comprises mounting means on the forward ends of each quill, a rotating cam on the mounting means of the outer quill, a ring gear fastened to said frame, a gear chain connecting said cam and ring whereby said cam rotates upon rotary movement of said outer quill, an intermediate member mounted on said outer quill and positioned to be shifted by said inner quill upon relative movement between the inner and outer quills, and means on said intermediate member to be actuated by said cam to cause motion of said inner quill relative to said outer quill during the rotation of the parts to effect a spiral movement of the cutter spindle in a taper thread cut.

8. In a planetary milling machine of the type having an inner quill, an outer quill, a cutter spindle, and a frame supporting the quills, a means for providing compensating movement in a taper thread cut which comprises a mounting means on the forward end of said outer quill, a rotatable member on the said mounting means positioned on an axis parallel to that of the quills, and means operably connecting said member and said frame whereby said member rotates upon movement of said outer quill, an intermediate member mounted to shift with said inner quill, and means connecting said rotatable member and said intermediate member to transmit rotary motion of said rotatable member on the outer quill to relative rotary motion between said inner and outer quills to effect a spiral movement of the cutter spindle in a taper thread cut while both quills are moving.

HAROLD NORBERG.
LLOYD L. LEE.

REFERENCES CITED

The following references are of record in the file of this patent:

UNITED STATES PATENTS

| Number | Name | Date |
|---|---|---|
| 1,507,235 | Hall | Sept. 2, 1924 |
| 2,266,338 | Sheaffer | Dec. 16, 1941 |